Oct. 10, 1950 L. K. EICHER 2,525,341
BEATER SCRAPER
Filed April 5, 1948
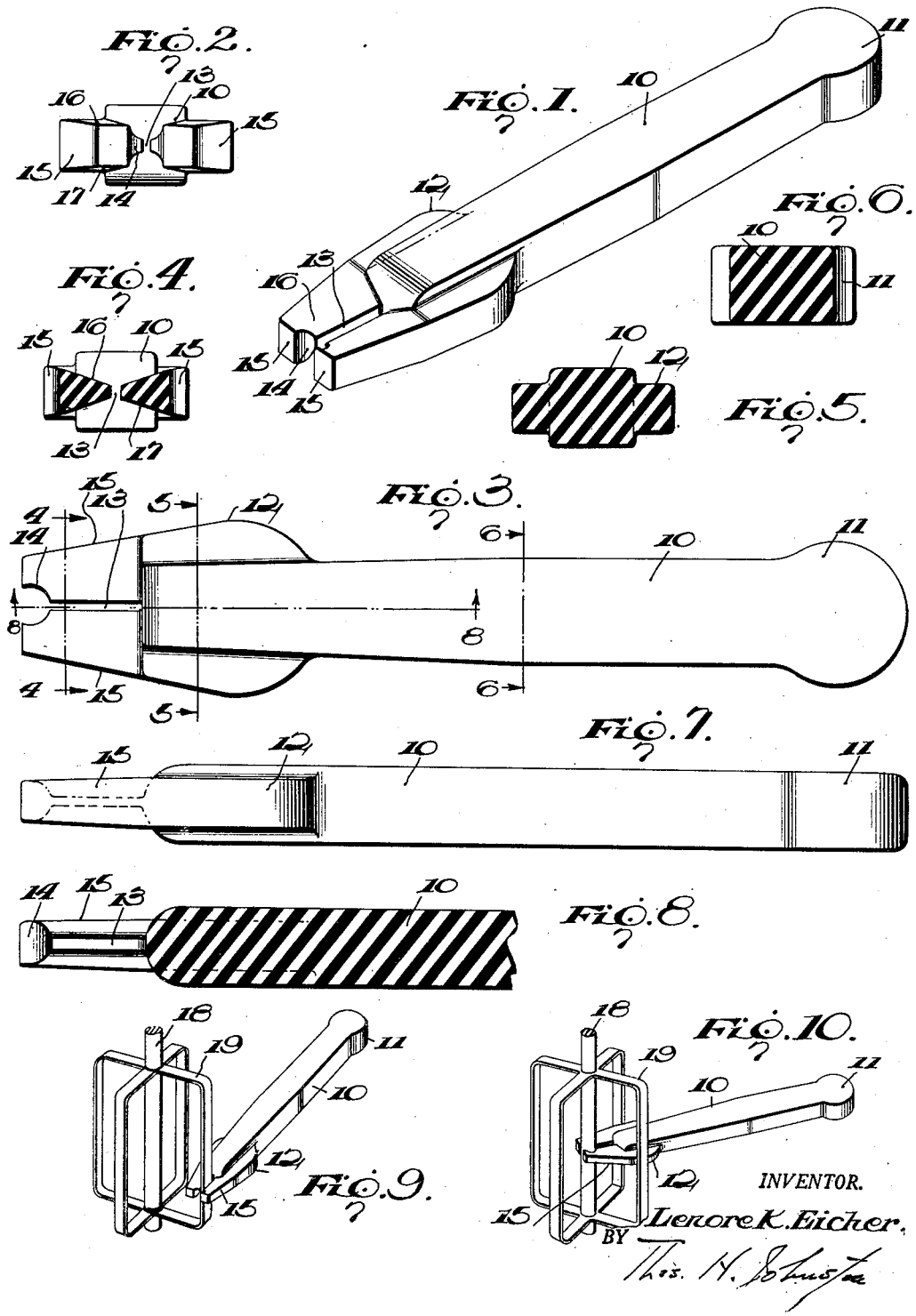
INVENTOR.
Lenore K. Eicher,
BY Thos. H. Johnston Patented Oct. 10, 1950

2,525,341

UNITED STATES PATENT OFFICE 2,525,341

BEATER SCRAPER

Lenore K. Eicher, Arcadia, Calif.

Application April 5, 1948, Serial No. 19,081

2 Claims. (Cl. 15—245)

1

This invention relates to an improved scraper for the beaters of electrically driven or other mixers at present so popularly used for culinary purposes.

As is well known, the beaters of popular electric mixers comprise, in some instances, a cylindrical shaft to which is fixed a number of spaced semi-circular blades, while in other instances, similarly disposed rectangular blades are employed. In either instance, the blades are, due to the restricted space between the blades, difficult to clean, and since the lower end of the shaft is more or less enclosed by the blades, it is likewise difficult to clean said end of the shaft, with the result that food or other material, as, for instance, batter or mayonnaise, or the like, is often left sticking to the beaters and so wasted.

An object of the present invention, therefore, is to provide a culinary hand-implement which may be conveniently manipulated to scrape a residue of food or other substance from the blades of a beater as well as the lower end of the beater shaft without smearing the material collecting on the scraper, as any one blade or the lower end of the shaft is scraped, onto another adjacent blade.

A further object of the invention is to provide a scraper embodying a head having a slot therein to define a pair of jaws, wherein the slot will be of a width to more or less tightly receive a beater blade therein so that the jaws will hug the blade at opposite sides thereof, thus permitting the jaws to be moved along the blade to scrape material therefrom, and wherein by twisting the handle of the scraper slightly in either one direction or the other, diagonal upper and lower edges of the walls of said slot may be caused to impinge the blade at opposite sides thereof for cleanly shearing the material from the blade as the jaws are moved therealong.

Another object of the invention is to provide a scraper wherein the outer ends of the jaws thereof will be provided at the mouth of the slot therebetween with a semi-circular notch adapted to hug a beater shaft so that the jaws may be moved up and down along the shaft either above the beater blades or at the lower end portion of the shaft between the blades for scraping material therefrom.

And the invention seeks, as a still further object, to provide a device wherein the scraper jaws will be provided therebetween at opposite sides of the slot separating the jaws with collector channels adapted to retain material scraped from a beater blade as the jaws are moved either

2 up or down along the blade, so that as the scraping operation progresses, material scraped from the shaft or any one blade will not be accidentally smeared by the jaws onto an adjacent blade.

Other and incidental objects of the invention will appear during the course of the following description thereof, and in the drawings:

Figure 1 is a perspective view of my improved scraper.

Figure 2 is a front end elevation of the device.

Figure 3 is a plan view of the scraper.

Figure 4 is a section on the line 4—4 of Figure 3.

Figure 5 is a section on the line 5—5 of Figure 3.

Figure 6 is a section on the line 6—6 of Figure 3.

Figure 7 is an edge elevation of the device.

Figure 8 is a fragmentary longitudinal section on the line 8—8 of Figure 3.

Figure 9 is a perspective view showing the use of the device to scrape the blades of a beater.

Figure 10 is a perspective view showing the use of the device to scrape the shaft of a beater.

In accordance with the present improvements, my improved scraper embodies a shank 10 which, as seen in Figure 6 of the drawings, is preferably rectangular in cross section and is provided at its outer end with a rounded knob 11 so that the shank may not easily slip out of the hand. At its inner end, the shank is formed with a spatulate head 12 extending at its base laterally from the shank medially thereof and tapered in width and thickness toward its free end. Preferably, the shank, knob, and head are moulded or otherwise fashioned as an integral one-piece structure of rubber or other approved material.

Medially, the head 12 is provided forwardly of the inner terminal of the shank 10 with a straight longitudinal slot 13 at the mouth of which is formed a semi-circular notch 14. A pair of like coacting jaws 15 is thus defined at opposite sides of the slot.

The side walls of the slot 13 are flat and parallel, and it is now to be observed that what may be termed for convenience of description as the upper and lower faces of the jaws 15 are beveled in like degree toward the slot 13 to provide, as best seen in Figure 4, a collector channel 16 at the upper sides of the jaws, and a like collector channel 17 at the lower sides of the jaws. The jaws are thus triangular in cross section, and, as will be understood, have, in reality, no upper and lower sides which may be accurately designated as such, since the device may be used with either side of the head 12 up. The distinction, as herein used is, as stated, merely for convenience of description.

While the jaws 15 are tapered in thickness toward their free ends and are not as thick as the shank 10 still, said jaws are more than half as thick as the shank and are thus sufficiently rugged to accomplish the scraping operation intended. Furthermore, due to the pronounced thickness of the jaws, the collector channels 16 and 17 are correspondingly deep. It should be noted that the rubber or other material of which the device is formed is of a character to impart resiliency and semi-flexibility to the jaws. On the one hand, the jaws may not be said to be limber or, on the other hand, may not be said to be stiff, but are between the two as could be described as of medium rigidity. Similarly, the jaws are neither hard nor soft, but are between the two as could be described as firm. Preferably, the side walls of the slot 13 are, as shown, quite narrow.

In Figure 9 of the drawings, I have shown the manner in which the device is employed to scrape the blades of a conventional beater, the shaft of which latter is indicated at 18 and the blades thereof at 19. As will be observed, the jaws 15 are disposed to straddle the blade to be scraped so that the blade is thus received in the slot 13. This slot is of a width such that the side walls of the slot, which side walls form the truncated longitudinally tips of the jaws, more or less tightly hug the blade at opposite sides thereof. Accordingly, by moving the jaws up and down along the blade, food or other substance sticking to the blade may be scraped therefrom. As the jaws are moved upwardly along the blade, material scraped therefrom will collect in the channel 16 while, as the jaws are moved downwardly, such material will collect in the channel 17. In each instance, the material in either channel will lie within the lines of the jaws below the outer longitudinal corners thereof so that as the jaws are manipulated in the cramped space between the blades, the material in the channels scraped from any one blade will not be smeared onto an adjacent blade. When the channels become filled, the device may be readily withdrawn and the jaws cleaned.

In connection with Figure 9 of the drawings, it is further to be noted that should the material stubbornly stick to the blade being cleaned, a twisting tension may be given the shank 10 to cant the jaws 15 somewhat. The upper edge of one wall of the slot 13 on one jaw and the lower edge of the other wall of said slot on the other jaw will thus be caused to impinge the side faces of the blade so that as the jaws are moved up and down along the blade, said edges will tend to shear the material from the blade and thus effect a more ready cleaning thereof. As will be appreciated, the jaws 15 will yieldably give slightly as the shank is twisted so that injury to the blade may not result.

In Figure 10 of the drawings, I have shown the manner in which the device is used to scrape the beater shaft 18. In this instance, the outer ends of the jaws 15 are pushed about the shaft so that the shaft is received in the notch 14. Thus, the jaws may, thereafter, be moved up and down along the shaft for scraping material therefrom into the channels 16 and 17, while, if so desired, the jaws may be canted, as previously described, to shear the material from the shaft.

Having thus described my invention, I claim:

1. In a beater scraper, the combination of a pair of resilient jaws of medium rigidity and softness joined at their inner ends to provide a head and formed with flat parallel inner scraping edges closely confronting each other to define a slot between the jaws adapted to tightly receive a beater blade, the outer free ends of said jaws being each provided on an opposite side of said slot with an arcuate notch and said notches facing one another in complementary relationship to form the mouth of said slot adapted to pilot a beater blade into said slot as well as adapted to receive a beater shaft fitting in said notches whereby the tips of the jaws may be moved along the shaft for scraping the same, and a handle carried by said head.

2. In a beater scraper, the combination of a pair of resilient jaws of medium rigidity and softness joined at their inner ends to provide a head and formed with flat parallel inner scraping edges closely confronting each other to define a slot between the jaws adapted to tightly receive a beater blade, the outer free ends of said jaws being each provided on an opposite side of said slot with an arcuate notch and said notches facing one another in complementary relationship to form the mouth of said slot adapted to pilot a beater blade into said slot as well as adapted to receive a beater shaft fitting in said notches whereby the tips of the jaws may be moved along the shaft for scraping the same, and a handle carried by said head, said jaws being tapered in width and thickness toward their free ends but being more than half as thick as the handle and being each of truncated triangular shape in cross section to form flat upper and lower jaw faces sloping from the outer edges of the jaws to said slot and defining channels extending throughout the width of said jaws above and below said slot.

LENORE K. EICHER.

REFERENCES CITED

The following references are of record in the file of this patent:

UNITED STATES PATENTS

| Number | Name | Date |
| --- | --- | --- |
| 2,256,650 | Reid et al. | Sept. 23, 1941 |
| 2,280,225 | Finley | Apr. 21, 1942 |

FOREIGN PATENTS

| Number | Country | Date |
| --- | --- | --- |
| 16,871 | Great Britain | 1893 |